(12) United States Patent  
Cooper et al.

(10) Patent No.: US 9,046,623 B2  
(45) Date of Patent: Jun. 2, 2015

(54) METHOD AND SYSTEM OF GAMMA PULSE TELEMETRY

(75) Inventors: Paul A. Cooper, Houston, TX (US); Kevin R. Kapka, Whitehouse, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 652 days.

(21) Appl. No.: 13/466,287

(22) Filed: May 8, 2012

(65) Prior Publication Data

US 2013/0300570 A1    Nov. 14, 2013

(51) Int. Cl.
- *G01V 3/00* (2006.01)
- *G01V 1/00* (2006.01)
- *E21B 47/14* (2006.01)
- *G01V 1/40* (2006.01)
- *E21B 47/16* (2006.01)
- *E21B 47/18* (2012.01)
- *G01V 5/12* (2006.01)

(52) U.S. Cl.
    CPC ........................................ *G01V 5/12* (2013.01)

(58) Field of Classification Search
    USPC ............ 340/853.1–856.4; 367/25–35, 81–85; 166/250.01–250.17; 33/300–314
    See application file for complete search history.

(56) References Cited

U.S. PATENT DOCUMENTS

| | | | | |
|---|---|---|---|---|
| 3,618,001 A * | 11/1971 | Zill et al. | | 340/855.3 |
| 3,745,521 A * | 7/1973 | Zill | | 340/855.3 |
| 4,524,273 A * | 6/1985 | Hubner | | 250/269.3 |
| 6,516,663 B2 * | 2/2003 | Wong | | 73/152.52 |
| 2004/0090234 A1 * | 5/2004 | Macune | | 324/337 |
| 2007/0017673 A1 * | 1/2007 | Hurst et al. | | 166/255.1 |

OTHER PUBLICATIONS

U.S. Appl. No. 13/264,336 titled Acoustic Velocity Measurements Using Tilted Transducers, filed Oct. 13, 2011.

* cited by examiner

*Primary Examiner* — Firmin Backer  
*Assistant Examiner* — Jerold Murphy (57) ABSTRACT

Gamma pulse telemetry. At least some of the illustrative embodiments are methods including: reading data associated with a borehole penetrating an earth formation; encoding the data in a first plurality of gamma bursts, the encoding by an encoding system coupled within the drill string, and where the each gamma burst travels a first distance along the borehole; receiving the first plurality of gamma bursts by a receiver system coupled within the drill string; and decoding the first plurality of gamma bursts and thereby recovering the data.

20 Claims, 9 Drawing Sheets

METHOD AND SYSTEM OF GAMMA PULSE TELEMETRY

CROSS-REFERENCE TO RELATED APPLICATIONS

None.

BACKGROUND

Hydrocarbon drilling and production operations demand a great quantity of information relating to parameters and conditions downhole. Such information may comprise characteristics of the earth formations traversed by the borehole, along with data relating to the size, configuration, and direction of the borehole itself. The collection of information relating to conditions downhole is termed "logging."

Drillers often log the borehole during the drilling process, thereby eliminating the necessity of removing or "tripping" the drilling assembly to insert a wireline logging tool to collect the data. Data collection during drilling also enables the driller to make accurate modifications or corrections as needed to steer the well or optimize drilling performance while minimizing down time. Techniques for measuring conditions downhole, including the movement and location of the drilling assembly contemporaneously with the drilling of the well, have come to be known as "measurement-while-drilling" techniques, or "MWD". Similar techniques, concentrating more on the measurement of formation parameters, have been referred to as "logging-while-drilling" techniques, or "LWD". While distinctions between MWD and LWD may exist, the terms MWD and LWD often are used interchangeably.

In logging systems, sensors in the drill string measure the desired drilling parameters and formation characteristics. While drilling is in progress, data associated with the logging system may be continuously or intermittently sent to the surface by some form of telemetry. Many logging systems use the drilling fluid (or mud) in the drill string as the information carrier, and are thus referred to as mud pulse telemetry systems. However, data transfer rates in mud pulse telemetry systems are relatively low, on the order of five bits per second or less of actual downhole data. Pulses in drilling fluid experience frequency dispersion with increasing distance traveled, and thus for extended reach of wells (e.g., between 30,000 and 50,000 feet in length) even lower data rates through drilling fluid may be experienced. Moreover, pulses in the drilling fluid do not propagate well past some devices in the drill string, such as mud motors and agitators, further limiting the applicability of mud pulse telemetry as a carrier medium of communication along the drill string.

BRIEF DESCRIPTION OF THE DRAWINGS

For a detailed description of exemplary embodiments, reference will now be made, by way of example only, to the accompanying drawings in which.

NOTATION AND NOMENCLATURE

Certain terms are used throughout the following description and claims to refer to particular system components. As one skilled in the art will appreciate, oilfield service companies may refer to a component by different names. This document does not intend to distinguish between components that differ in name but not function.

In the following discussion and in the claims, the terms "including" and "comprising" are used in an inclusive fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Gamma" or "gammas" shall mean gamma energy of 200 kilo electron Volt (keV) or above, and shall include such energy whether such energy is considered a particle (i.e., gamma particle) or a wave (i.e., gamma ray or wave).

"Gamma source causes gamma bursts" shall mean that gamma bursts occur, and such language shall not speak to whether the gamma source creates the gammas (e.g., by a particle interaction) or releases the gammas (e.g., from a radioactive source).

"Above" in relation to a drill string shall refer to location of a device in relation to the drill bit, not to a true vertical depth. For example, a device coupled within a drill string between the surface and the drill bit shall be considered "above" the drill bit even if the device resides at a deeper true vertical depth than the drill bit.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The various embodiments are directed to methods and related systems of communication of data along a drill string. The various embodiments were developed in the context of communication from downhole devices to surface devices, and the description that follows is based on the developmental context. However, communication from surface devices to downhole devices using the various techniques is also contemplated, and thus the developmental context shall not be read as a limitation. Before turning to specifics, the specification first turns to illustrative systems to orient the reader to the systems within which the various embodiments may be practiced.

Figure 1:
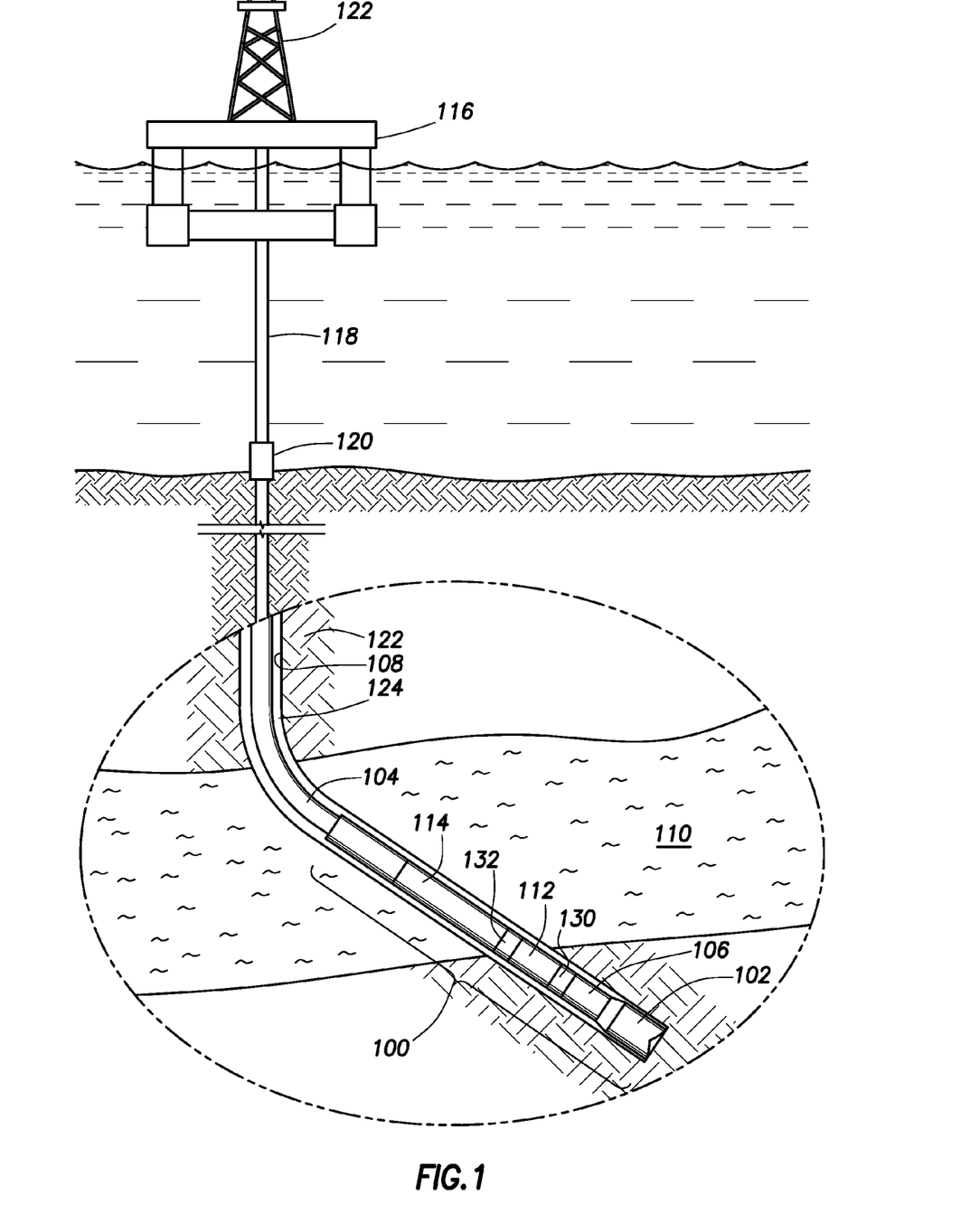
FIG. 1 shows a subsea system in accordance with at least some embodiments.

FIG. 1 shows a bottomhole assembly 100 for a subsea drilling operation, where the bottomhole assembly 100 illustratively comprises a drill bit 102 on the distal end of the drill string 104. Various LWD and MWD tools also may be coupled within the bottomhole assembly 100. For example, a logging tool 106 may be coupled just above the drill bit, where the logging tool may read data associated with the borehole 108 (e.g., a MWD tool), or the logging tool 106 may read data associated with a hydrocarbon reservoir (e.g., a LWD tool). In some cases, the bottomhole assembly 100 may comprise a mud motor 112. The mud motor 112 may derive energy from drilling fluid flowing within the drill string 104, and from the energy extracted the mud motor 112 may rotate the drill bit 102 (and if present the logging tool 106) separate and apart from any rotation imparted to the drill string by surface equipment. Above the mud motor 112 in the drill string may reside one or more further logging tools 114.

The bottomhole assembly 100 is lowered from a drilling platform 116 by way of the drill string 104. The drill string 104 extends through a riser 118 and a well head 120. Drilling equipment supported within and around derrick 122 may rotate the drill string 104, and the rotational motion of the drill string 104 and/or the rotational motion created by the mud motor 112 causes the bit 102 to form the borehole 108 through the formation material 122. The volume defined between the drill string 104 and the borehole 108 is referred to as the annulus 124. The borehole 108 penetrates subterranean zones or reservoirs, such as reservoir 110, believed to contain hydrocarbons in a commercially viable quantity.

In accordance with at least some embodiments, the bottomhole assembly 100 may further comprise two or more communication subsystems. In the illustrative case of bottomhole assembly 100, two communication subsystems are shown—communication subsystem 130 above the logging tool 106 but below the mud motor 112, and communication subsystem 132 above the mud motor 112. As mentioned briefly in the Background section, in many cases information carrying pressure pulses cannot pass some intermediate devices, such as mud motor 112, without loss of the information. Thus, in accordance with at least some embodiments the communication subsystems 130 and 132 are used to communicate data across the illustrative mud motor 112 by modulating or encoding the data in gamma pulses. Communication of data encoding in gamma pulses is discussed in greater detail below.

Figure 2:
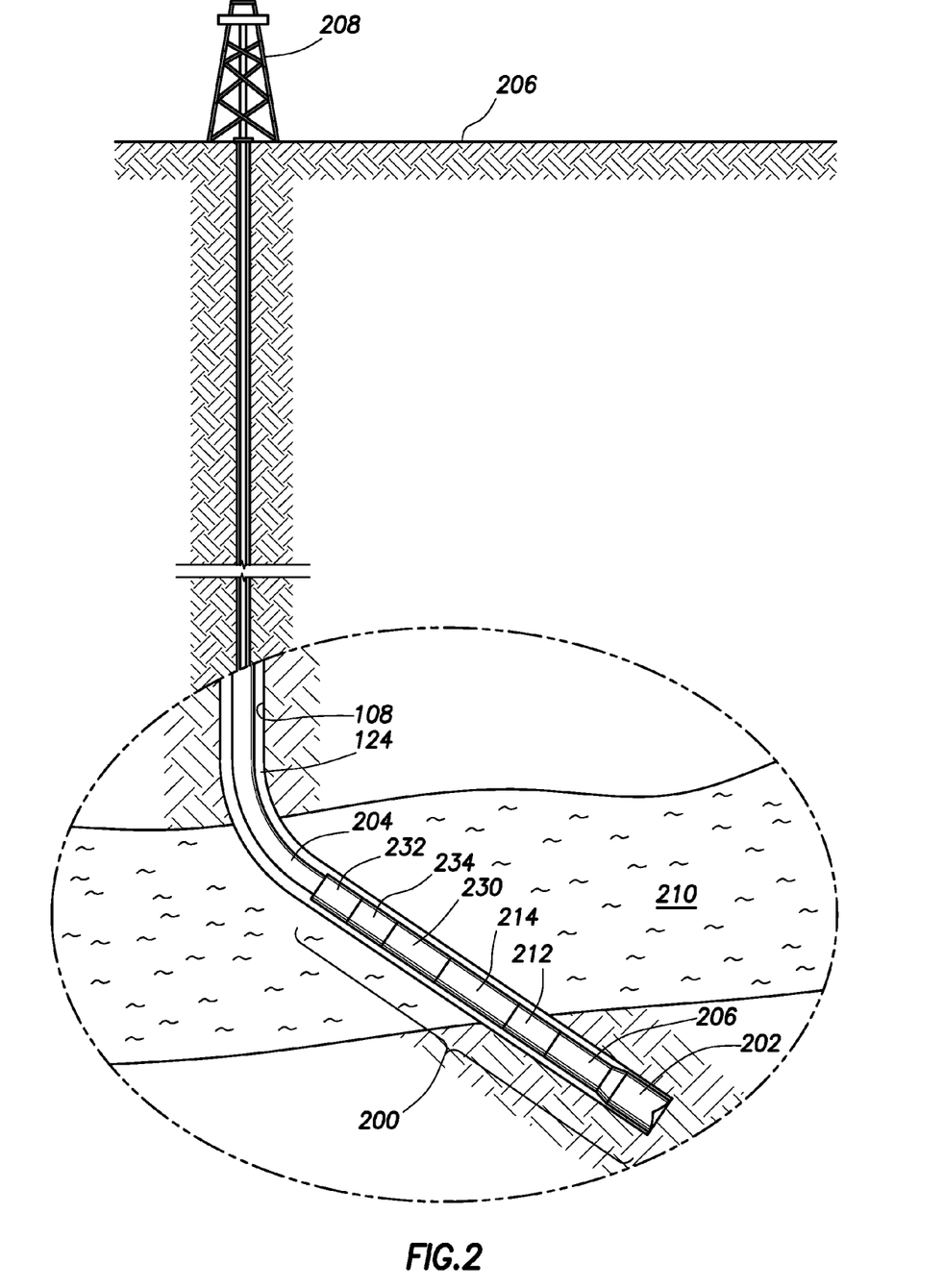
FIG. 2 shows a land-based system in accordance with at least some embodiments.

FIG. 2 shows bottomhole assembly 200 in use in a land-based drilling operation. In particular, the bottomhole assembly 200 comprises a drill bit 202 on the distal end of the drill string 204. Various LWD and MWD tools also may be coupled within the bottomhole assembly 200. For example, a logging tool 206 may be coupled just above the drill bit 202, where the logging tool may read data associated with the borehole 204 (e.g., a MWD tool), or the logging tool 206 may read data associated with hydrocarbon reservoir (e.g., a LWD tool). In some cases, the bottomhole assembly 200 may also comprise a mud motor 212. Above the mud motor 212 in the drill string 204 may reside one or more further logging tools 214.

The bottomhole assembly 200 is lowered from the surface 206 by equipment associated with derrick 208. Drilling equipment supported within and around derrick 208 rotates the drill string 108, and the rotational motion of the drill string 204 and/or the rotational motion created by the mud motor 212 causes the bit 202 to form the borehole 108 through the formation material.

In accordance with at least some embodiments, the bottomhole assembly 200 may further comprise two or more communication subsystems. In the illustrative case of bottomhole assembly 200, two communication subsystems are shown—communication subsystems 230 and 232 residing on opposing sides of an intermediate device 234. In the illustrative bottomhole assembly 200 the intermediate device 234 may be an agitator, which is designed to provide vibratory motion to the drill string 204, where the vibratory motions is thought to help avoid sticking of the drill string within the borehole 108. However, an intermediate device in the form of an agitator may derive operational energy from drilling fluid within the drill string 204, and between extracting operational energy and the motion of the agitator itself, in many cases information carrying pressure pulses cannot pass the intermediate device 234 without loss of information. Thus, in accordance with at least some embodiments, the communication subsystems 230 and 232 are used to communicate data across intermediate device 234 in the form of an agitator by modulating or encoding the data in gamma pulses. Further still, the intermediate device may be an otherwise passive device, such as one or more lengths of pipe that make up the drill string 204.

Before proceeding, it should be understood that the bottomhole assembly 100 associated with the subsea drilling operation of FIG. 1 is not limited to subsea drilling operations. Likewise, the bottomhole assembly 200 associated with the land-based drilling operation of FIG. 2 is not limited to land-based drilling operations. The relationship of the various components of bottomhole assembly 100 may be used in a land-based drilling operation, and the bottomhole assembly 200 may be used in a subsea drilling operation. Moreover, multiple sets of communication subsystems may be disposed within a single bottomhole assembly (e.g., one set to communication across the mud motor, and another set to communicate across the intermediate device 234).

Figure 3:
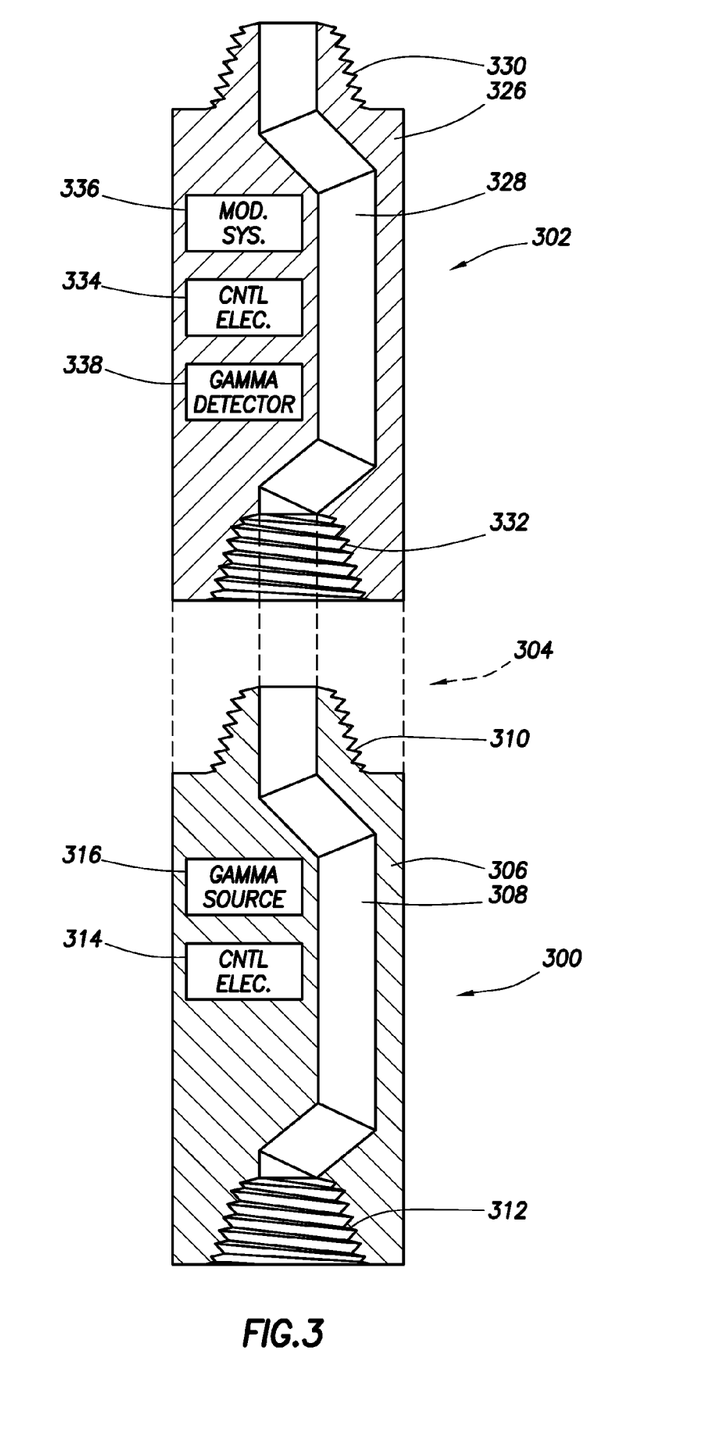
FIG. 3 shows a cross-sectional elevation view of a set of communication subsystems in accordance with at least some embodiments.

FIG. 3 shows, in block diagram form, a cross-sectional elevation view of pair of communication subsystems in accordance with at least some embodiments. In particular, FIG. 3 shows a first or lower communication subsystem 300 coupled to a second or upper communication subsystem 302. The lower communication subsystem 300 mechanically couples to the upper communication subsystem 302 by an intermediate device 304, such as a mud motor, agitator, or one or more sections of drill pipe. The lower communication subsystem 300 may be representative of either of communication subsystems 130 or 230, and upper communication subsystem 302 may be representative of either of communication systems 132 or 232.

Lower communication subsystem 300 comprises a tool body 306, which may be made of a metallic material. Inasmuch as rotational energy may be transferred through the communication subsystem 300 to a drill bit, the tool body 306 may be designed and constructed to carry appropriate mechanical loads. The tool body 306 defines an inner fluid pathway 308 through which drilling fluid flows to the drill bit, the drilling fluid pumped from surface equipment. As shown, the inner fluid pathway 308 may be offset from the axial centerline of the tool body 306 to enable more space within which to place other components of the lower communication subsystem 300, but such an offset is not strictly required. For the illustrative communication subsystem 300, the tool body couples to other devices of the bottomhole assembly by way of a threaded male "pin" end connector 310 on one end, and a threaded female "box" end connector 312 on the other end.

At least a portion of the tool body 306 forms a pressure vessel within which various components for implementing data communications are located. As illustrated, the lower communication subsystem 300 may comprise control electronics 314 and a gamma source 316 within a portion of the tool body. The pressure vessel portions may be implemented in any suitable fashion, such as by milling chambers within the tool body where the chamber is sealed against drilling fluid intrusion by cover plates on an outer surface of the tool body, or the chambers may be formed by concentric telescopically coupled portions of an inner tool body within the overall tool body 306. The control electronics 314 operatively couple to other devices in the bottomhole assembly, such as one more logging tools, such that logging data to be sent to the surface may be gathered. Likewise, the control electronics 314 operatively couple to the gamma source 316, and by way of the operative coupling the gamma source 316 directs the gamma source 316 to create and/or release gamma bursts, where the gamma bursts encode data received from logging tools.

Upper communication subsystem 302 comprises a tool body 326, which may be made of a metallic material. Inasmuch as rotational energy may be transferred through the communication subsystem 302 to a drill bit, the tool body 326 may be designed and constructed to carry appropriate mechanical loads. The tool body 326 defines an inner fluid pathway 328 through which drilling fluid flows to the drill bit. As shown, the inner fluid pathway 328 may be offset from the axial centerline of the tool body 326 to enable more space within which to place other components of the upper communication subsystem 302, but such an offset is not strictly required. For the illustrative communication subsystem 302, the tool body couples to other devices of the drill string by way of a threaded male "pin" end connector 330 on one end, and a threaded female "box" end connector 332 on the other end.

At least a portion of the tool body 326 forms a pressure vessel within which various components for implementing data communications are located. As illustrated, the upper communication subsystem may comprise control electronics 334, a modulation system 336, and a gamma detector 338 all disposed within a portion of the tool body. The pressure vessel portions may be implemented in any suitable fashion. The control electronics 334 operatively couple to both the gamma detector 338 and the modulation system 336.

In accordance with at least some embodiments, the lower communication subsystem 300 and the upper communication subsystem 302 work together to implement data telemetry over a portion of the distance spanned by the drill string. For the specific case of telemetry of data toward the surface, the lower communication subsystem 300, particularly the control electronics 314, receives data from devices in the drill string (e.g., logging tools in the bottomhole assembly). The control electronics 314, through the operative coupling to the gamma source 316, encodes the data in gamma bursts created by the gamma source 316. More particularly still, in some embodiments the control electronics 316 encodes the data in the form of pulse-position modulation, but other binary encoding systems may be used. The gamma bursts propagate away from the gamma source 316, and at least some of the gammas find their way to the gamma detector 338. Based on gamma arrivals detected by the gamma detector 338, the control electronics 334 of the upper communication subsystem 302 decodes the gamma bursts received to recover the data sent by the lower communication subsystem 300. Thus, using gammas as a communication medium, the communication subsystems 300 and 302 work in concert to enable communication spanning the intermediate device 304, where the communication need not rely on pressure pulses in the drilling fluid column within the inner fluid pathways 308 and 328.

While in some cases a communication between the two communications subsystems alone may be an ultimate goal, in other cases the telemetry of data to the surface may be the ultimate goal. As illustrated in FIG. 3, the upper communication subsystem comprises a modulation system 336. Thus, in some cases data recovered by decoding gamma bursts originating at the lower communication subsystem 300 may be encoded in another carrier medium by the modulation system 336. That is, the control electronics 334 may encode the data sent from the lower communication subsystem 300 in a carrier medium to continue the process of data telemetry toward the surface. In one embodiment, the modulation system 336 may be a gamma source, such that the upper communication subsystem 302 sends the data toward the surface in further gamma bursts. In yet still other embodiments, the modulation system 336 may be a system designed and constructed to create pressure pulses within the drilling fluid column within the inner fluid pathway 328, which pressure pulses then propagate to devices above the upper communication subsystem 302 in the drill string, such as surface devices. The pressure pulses may be positive pulses (e.g., created by selectively blocking or impeding fluid flow in the inner fluid pathway 328) or the pressure pulses could be negative pressure pulses (e.g., created by selectively dumping drilling fluid to the annulus by way of the modulation system). Moreover, the encoding scheme used with respect to the carrier medium being drilling fluid may take any suitable form, such as pulse-position modulation. In other cases, the modulation system 336 may encode data in any suitable carrier, such as by way of electromagnetic (EM) waves propagated within the annulus.

Having a modulation system 336 as part of a communication subsystem may have particular relevance as the final/initial "hop" in the system, closest to the surface. That is, in order to reduce exposure of rig workers to gamma energy, the final "hop" of an upward communication channel could be by way of a mud pulse system to reduce surface radiation. Likewise for downward communication, the first "hop" could be by way of mud pulse telemetry to again reduce radiation at the surface. Moreover, and regardless of direction, because of the proximity to the surface the mud pulse telemetry portion could operate at faster bit rates than a mud pulse system that spans the entire length of the drill string.

The embodiments illustrated in FIG. 3, with the lower communication subsystem 300 having the ability only to create gamma bursts, may find particular use at the distal end of the drill string (i.e., within a bottomhole assembly). That is, as illustrated the control electronics 314 of the lower communication subsystem 300 may receive data from closely coupled devices (e.g., a logging tool within the drill string), but the lower communication system 300 of FIG. 3 cannot receive data encoded in gamma bursts.

Extended length drill strings may have a reach of 30,000 to 50,000 feet, distances over which gamma bursts may not have sufficient signal strength to be detectable in a single "hop". Thus, in some embodiments, data telemetry over longer distances may be divided into data telemetry across several smaller sections of the drill string, with each section detecting gamma bursts from previous source, decoding the data, and re-encoding the data in set of gamma bursts directed toward the next detector.

Figure 4:
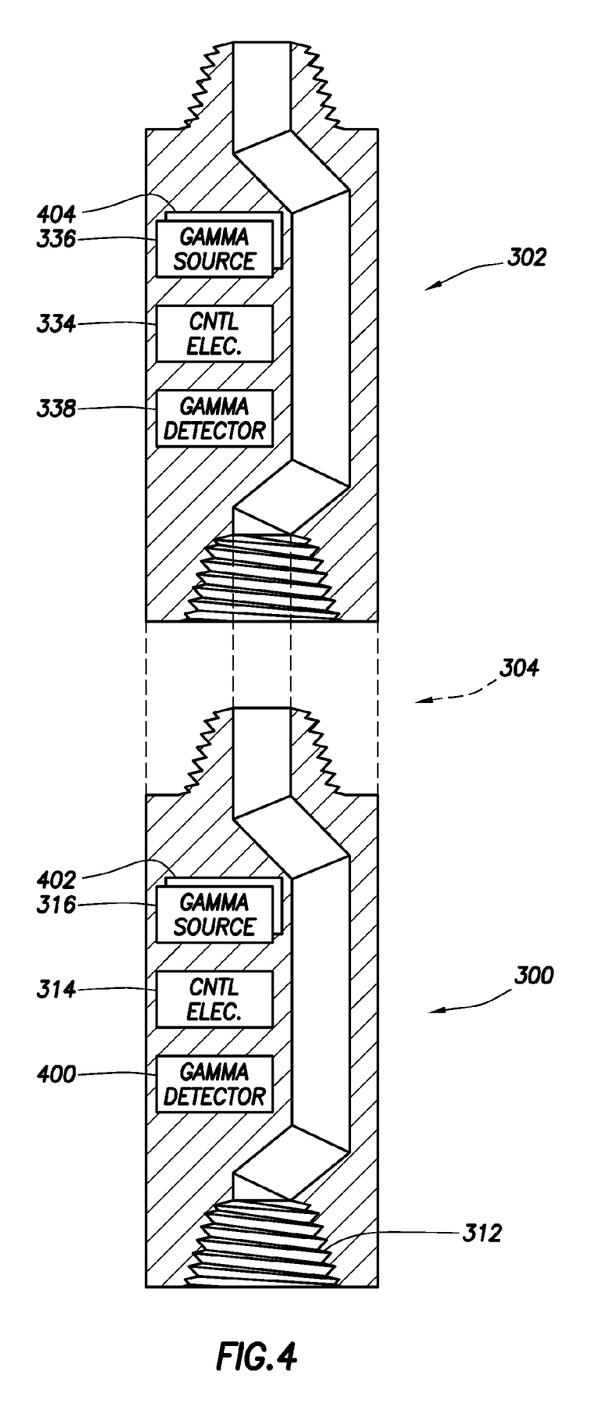
FIG. 4 shows a cross-sectional elevation view of a set of communication subsystems in accordance with at least some embodiments.

FIG. 4 shows a cross-sectional elevation view of pair of communication subsystems in accordance with still further embodiments. In particular, FIG. 4 shows lower communication subsystem 300 coupled to an upper communication subsystem 302 with intermediate device(s) 304 between. As before, the lower communication subsystem 300 may be representative of either of communication subsystems 130 or 230, and upper communication subsystem 302 may be representative of either of communication systems 132 or 232.

In the case of FIG. 4, however, the lower communication subsystem 300 comprises not only control electronics 314 and gamma source 316, but also a gamma detector 400. The upper communication subsystem 302 comprises gamma detector 338 and control electronics 334, and the modulation system 336 in this example system is shown as a gamma source. The communication subsystems 300 and 302 are thus representative of a "hop" in a system for data telemetry over longer distances, such as to the surface in a drilling operation. In particular, gamma bursts having data encoded therein may be created by gamma sources lower in the drill string than the communication subsystem 300. Gamma detector 400 of the lower communication subsystem 300 may detect the gamma bursts, and control electronics 314 decodes the data. Either after the data has been fully decoded, or after a portion of the data has been decoded, the control electronics 314 may encoded the data in gamma bursts created by gamma source 316, with the gamma bursts propagating toward the upper communication subsystem 302. At the upper communication subsystem 302, the data communications in the form of gamma bursts from the lower communication subsystem 302 may be detected, and repeated again in similar fashion, with the gamma bursts directed toward the next communication subsystem (not specifically shown).

It is noted that in some cases the communication subsystems 300 and 302 may be installed within a bottomhole assembly that also comprises a nuclear tool (e.g., a neutron-gamma tool, or gamma-gamma tool), and the gammas directly or indirectly created by the nuclear tool may interfere with operation of the communication subsystem. In some cases, the energy of gammas associated with the nuclear tool may be different, such that by algorithmically removing gammas of energy associated with the nuclear tool, data communication using gamma bursts may take place simultaneously with operation of the nuclear tool. However, in other cases coordination may take place. That is, a communication subsystem in proximity to the nuclear tool may be communicatively coupled to the nuclear tool not only to receive data, but also to receive indications of when the nuclear tool is or is about to operate. In these case, the communication subsystem may coordinate encoding data in gamma bursts with operation of the nuclear tool such that data communications by the communication subsystem occur during periods of time when gammas associated with the nuclear tool will not adversely affect the data communications.

In some embodiments, the physical distance between communications subsystems is chosen such that the potential for interference between gamma bursts from two different communication subsystems is reduced. For example, and still referring to FIG. 4, the distance between the communication subsystems 300 and 302 is selected such that gamma bursts created by communication subsystem 300 and directed to communication subsystem 302 are detectable by gamma detector 338, but gamma bursts from a communication subsystem below the communication subsystem 300 will have insufficient gamma intensity to severely adversely affect the data communication between the communication subsystems 300 and 302. For example, a gamma source with 2 Curie density may create sufficient gamma density to communicate over a 10 meter span, but not double the distance (20 meters).

In other embodiments, to further reduce the possibility of interference of gamma bursts, abutting sections of a communication channel may use gammas of different average energy. Still referring to FIG. 4, the lower communication subsystem 300 is shown to comprise a second gamma source 402 operatively coupled to the control electronics 314. In some embodiments, gamma source 316 produces gammas having a particular average energy, and gamma source 402 produces gammas have an average energy different than gamma source 316. Thus, depending on the average energy of gamma bursts from a communication subsystem lower in the drill string than communication subsystem 300, the control electronics may retransmit the data using a gamma source 316, 402 with a different average energy. In these illustrative embodiments, the upper communication subsystem 302, particularly the gamma detector 338, may detect gammas of a range of energies, and to the extent that there are gammas reaching the gamma detector 338 from communication subsystems lower in the drill string than communication subsystem 300, such gammas can be algorithmically removed by the control electronics 334 as part of the decoding process.

Upper communication subsystem 302 is likewise shown to have a second gamma source 404, and thus as part of retransmitting the data, the control electronics 302 may select a gamma source 336, 404 that produces gammas have a different average energy than the gammas that propagated from the lower communication subsystem 300.

Still referring to FIG. 4, the illustrative communication subsystems 300, 302 may also be used in a "dual channel" communication system. That is, gamma detectors not only detect gamma arrivals, but can also differentiate gammas of different energy. Various illustrative gamma detectors are discussed more below. In some embodiments the data rate between any two communication subsystems 300, 302 may be increased by encoding a first portion of the data in gamma bursts having a first average energy, and encoding a second portion of the data in gamma bursts having a second average energy. More specifically, and referring to the lower communication subsystem 300, the control electronics 314 may divide the data stream into a first portion and a second portion. The division may be arbitrary, or the division may be based on an underlying philosophy. For example, data regarding parameters closer to the bit (e.g., inclination at the bit, gamma resistivity at the bit) may be encoded in gamma bursts of the first average energy, and data gathered by other logging tools (e.g., sonic tools, electromagnetic tools) may be encoded in gamma bursts of the second average energy.

Regardless of how the data is divided, the control electronics 314 encodes a first portion of the data in gamma bursts created by the gamma source 316, and substantially simultaneously the control electronics 314 encodes a second portion of the data in gamma bursts created by gamma source 402. The gamma bursts propagate to and are detected by the gamma detector 338. As mentioned previously, the gamma detector 338 records not only arrivals of gammas, but also energy of each gamma arrival. Thus, the control electronics 334 algorithmically separate the gamma bursts as a function of energy, and thereafter decode the data encoded in each "channel". The process may be repeated by the upper communication subsystem 302 using gamma sources 336 and 404. It is noted that while the discussion of FIG. 4 has been based on data telemetry toward the surface, the same principles may be used for data telemetry in the downhole direction as well. The specification now turns to preferential pathways for the gammas.

Although illustrative gamma sources are discussed more below, consider for purposes of this discussion that gamma production from a gamma source is isotropic. That is, for purposes of this portion of the discussion consider that gammas stream outward in all directions from a gamma source. The distance gammas travel away from a source before being absorbed by an atom is a statistical concept that depends on the density of the material through which the gammas travel. For example, gammas statistically travel further through drilling fluid than gammas that travel in a rock formation. In order to increase the distance gammas from gamma bursts travel, in accordance with at least some embodiments the gamma sources (and related shielding material) are designed and constructed such that a preferential propagation pathway for the gammas is through the drilling fluid. More particularly still, in accordance with at least some embodiments the gamma sources, and related shielding material, are designed and constructed such that a preferential propagation pathway for the gammas is through the drilling fluid within the inner fluid pathway of the drill string.

Figure 5:
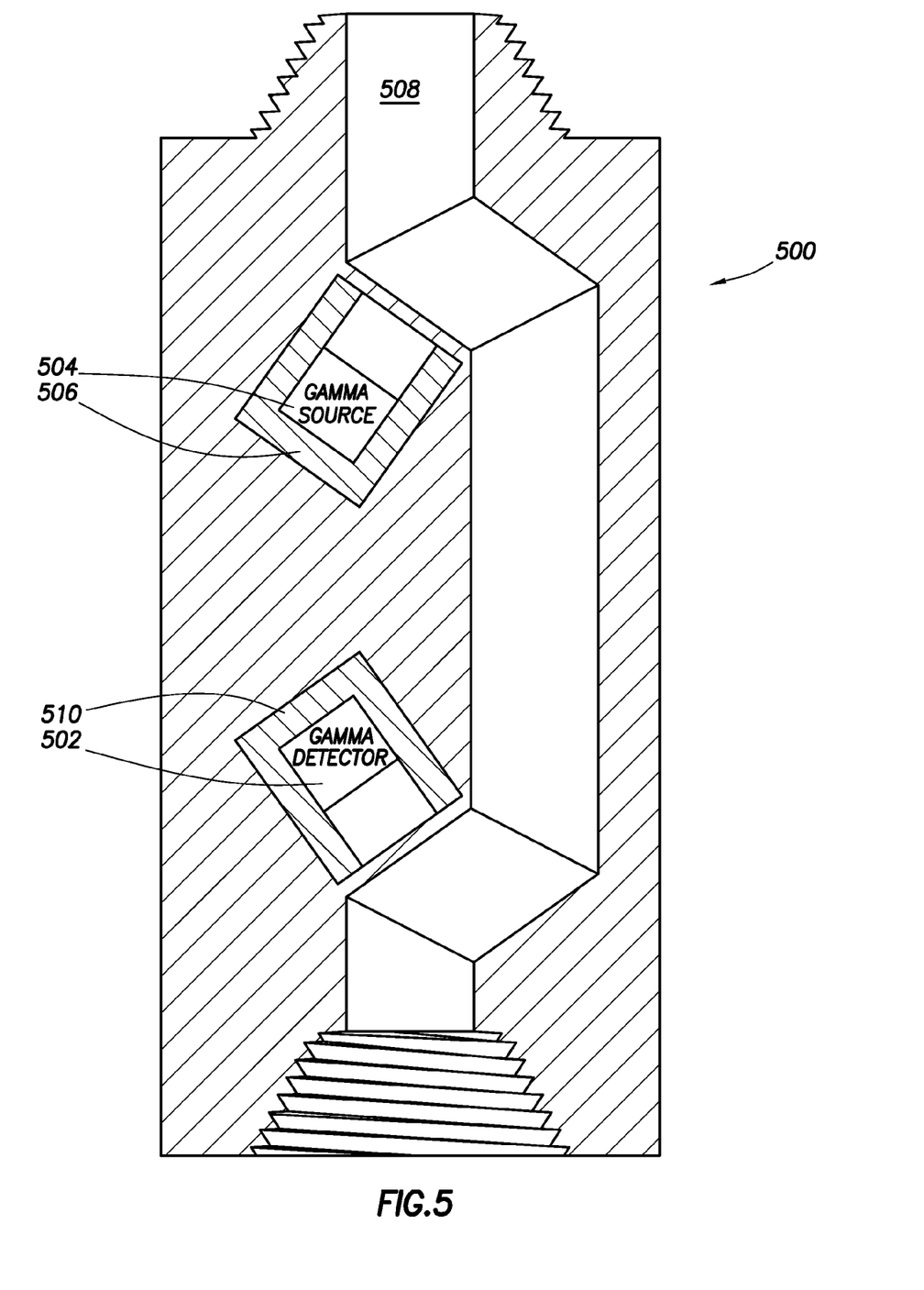
FIG. 5 shows a cross-sectional elevation view of a communication subsystem in order to explain preferential gamma paths in accordance with at least some embodiments.

FIG. 5 shows a cross-sectional elevation view of a communication subsystem 500. Communication subsystem 500 is illustrative of any of the communication subsystems previously discussed. Illustrative communication subsystem 500 is shown to have a gamma detector 502 and a gamma source 504. Gamma source 504 is positioned within the communication subsystem 500 such that gammas more favorably enter the inner fluid pathway 508. That is, for reasons of the placement of the gamma source 504, and particularly placement closer to the axial center, in combination with an offset inner fluid pathway 508, gammas more favorably enter and propagate within the drilling fluid of the inner fluid pathway 508. Because of the lower density of the drilling fluid than other substances encountered downhole (e.g., the formation), statistically speaking the distance the gammas travel may be increased. In some embodiments, gamma source placement proximate to the inner fluid pathway 508 alone may be sufficient to result in gammas more favorably entering the inner fluid pathway 508.

In other cases, shield material 506 may be placed in proximity to the gamma source 504. As illustrated, the gamma source 504 is partially surrounded by a shield material 506 of relatively high density (e.g., HEVIMET® available from General Electric Company of Fairfield, Conn.). However, in directions that favor gamma entry into the inner fluid pathway 508, the shield material is omitted as shown, or the shield material may be made thinner. Thus, gammas produced by the illustrative gamma source 504 traveling in directions where the gammas encounter the shield material are more likely to be absorbed (i.e., have a relatively short distance traveled), whereas gammas that encounter no shield material (or thinner shield material) may find their way into the drilling fluid in the inner fluid pathway 508.

The discussion to this point with respect to FIG. 5 has assumed an isotropic gamma source. However, some gamma sources may emit gammas that travel in particular directions (e.g., gamma sources based on particle acceleration toward target materials). In cases where the gamma source is somewhat directional, in accordance with at least some embodiments the gamma source is arranged such that the gammas tend to enter the drilling fluid in the inner fluid pathway 508.

Still referring to FIG. 5, illustrative gamma detector 502 is shown placed proximate to the inner fluid pathway 508. That is, the gamma detector is more closely located to the inner fluid pathway 508 than an outside surface of the communication subsystem 500. As with the gamma source, placement of the gamma detector closer to the axial centerline of the tool in combination with placement proximate the offset portion of the inner fluid pathway, the gamma detector 502 more favorably detects gamma propagating with the inner fluid pathway. The sensitivity to the gammas outside the inner fluid pathway may also be lowered by use of shield material 510. In particular and as illustrated, the gamma detector 502 is partially surrounded by a shield material 510 of relatively high density (e.g., HEVIMET®). However, in directions that favor gamma entry into the gamma detector 502, the shield material is omitted as shown, or the shield material may be thinner. Thus, gammas traveling within the drilling fluid in the inner fluid pathway 508 are more likely to be enter the gamma detector 502 than gammas entering the communication subsystem 500 from the annulus. Moreover, placement as illustrated in FIG. 5 may also make the gamma detector more sensitive to upward traveling gammas.

Figure 6:
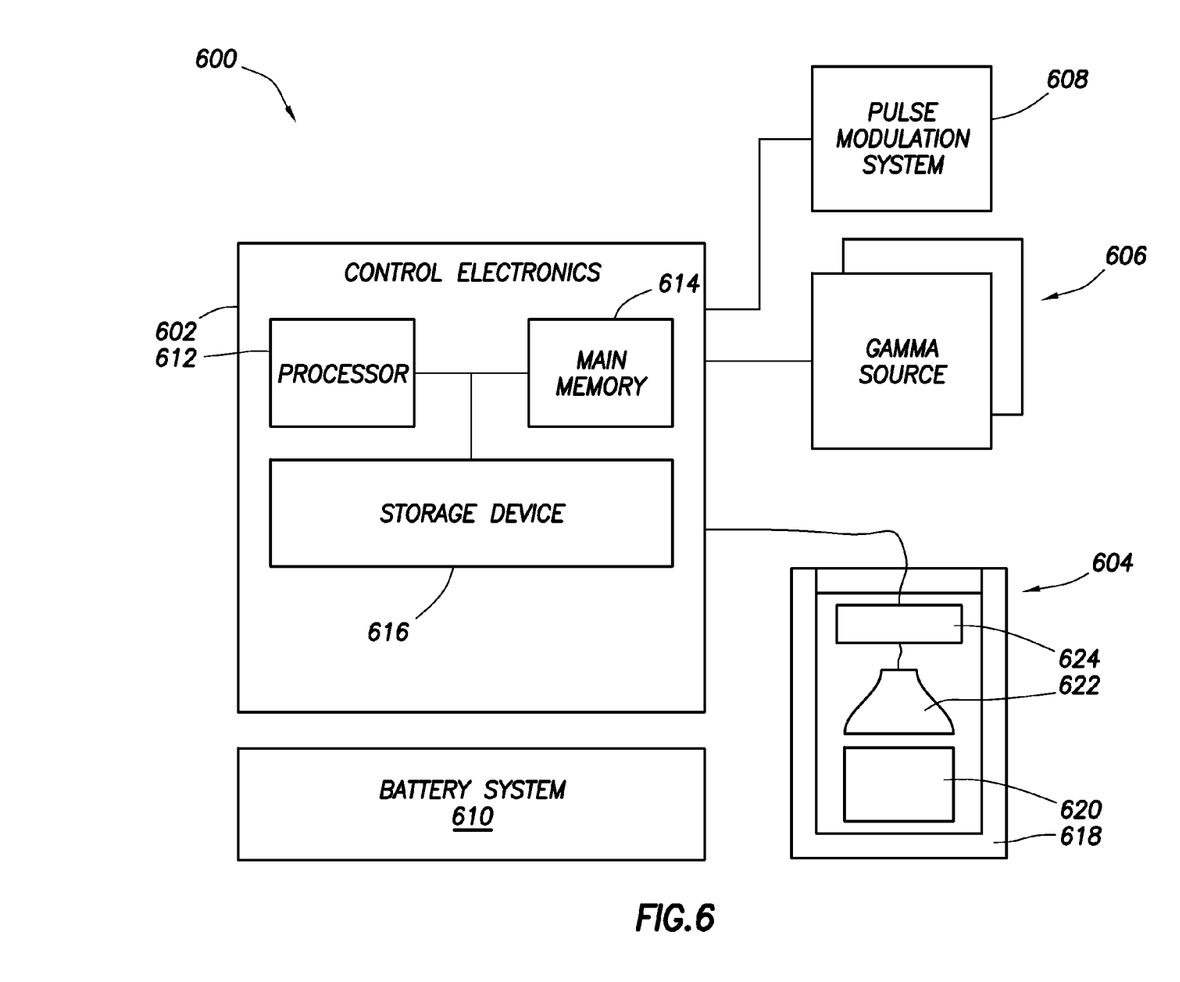
FIG. 6 shows an electrical block diagram in accordance with at least some embodiments.

FIG. 6 shows an electrical block diagram of a gamma-based communication subsystem in accordance with at least some embodiments. In particular, FIG. 6 illustrates electronic components of a communication subsystem 600, where communication subsystem 600 is representative of any of the aforementioned communication subsystems 300, 302, and/or 500. The communication subsystem 600 may comprise control electronics 602, gamma detector 604, gamma source(s) 606, pulse modulation system 608, and battery system 610. Each will be discussed in turn.

Control electronics 602 comprises a processor 612, and the processor couples to a main memory 614 and a long term storage device 616. Programs executable by the processor 612 may be stored on the storage device 616, and accessed when needed by the processor 612. The programs stored on the storage device 616 may comprise programs to implement the various embodiments of the present specification. In some cases, the programs are copied from the storage device 616 to the main memory 616, and the programs are executed from the main memory 616. Thus, both the main memory 614 and storage device 616 shall be considered computer-readable storage mediums. While the control electronics 602 are illustratively shown to comprise a distinct processor 612, main memory 614, and storage device 616, in other cases the components may be integrated as a single component, such as one of several commercially available microcontrollers.

The control electronics 602 electrically couple to a gamma detector 604. In some embodiments, and as illustrated, the gamma detector 604 may comprise an enclosure 618, and within the enclosure 618 may reside: a scintillation crystal 620 (e.g., a yttrium/gadolinium silicate crystal, sodium iodide scintillation crystal, bismuth germinate scintillation crystal); a photo multiplier tube 622 in operational relationship to the crystal 620; and a processor 624. As gammas are incident upon/within the scintillation crystal 620, the gammas interact with the crystal 620 and flashes of light are emitted. Each flash of light itself is indicative of an arrival of a gamma, and the intensity of light is indicative of the energy of the gamma. The output signal of the photomultiplier tube 624 is proportional to the intensity of the light associated with each gamma arrival. The processor 624 quantifies the output signal as gamma energy and relays the information the control electronics 602. Thus, not only can arrival time of each gamma be determined, but also a relative energy of each gamma.

In other embodiments, particularly embodiments where the energy of arriving gammas is not of concern, other gamma detecting devices may be used in place of the crystal-based gamma detector, such as such as photodiodes used in photovoltaic or photoconductive modes.

Still referring to FIG. 6, gamma source 606 is a continuous or controllable source of gammas. In a particular embodiment, gamma source 606 is a controllable (i.e., pulsed) gamma source. For example, gammas may be produced by acceleration of particles (e.g., electrons, neutrons, deuterium ions) toward a target material to produce gammas. In the case of pulsed gamma sources, the gamma source 606 produces the gammas under command the control electronics 602. Pulsed gamma source 606 may produce gammas tending to exit the gamma source 606 in a particle direction or range of directions. In such cases, the gamma source 606 may be arranged to direct the gamma along a particular path, such as within drilling fluid disposed in an inner fluid pathway.

In yet still other embodiments, the gamma source 606 may be a continuous source of gammas, such as radioisotope (e.g., CS-137). In such embodiments, encoding of data in gamma bursts may comprise moving a shield or window material associated with the continuous gamma source such that gammas are controllably released during burst times, and absorbed by the shield material during non-burst times. Based on use of movable shield material, a continuous gamma source may likely produce gammas tending to exit the gamma source in a direction or range of directions (e.g., through the location of the shield or window). In such cases, the gamma source 606 may be arranged to direct the gamma along a particular path, such as within drilling fluid disposed in an inner fluid pathway.

FIG. 6 also indicates that multiple gamma sources may be associated with a communication subsystem 600. In embodiments where multiple gamma sources are implemented, in some cases the average energy produced by each gamma source may be different. As discussed above, having multiple gamma sources enables additional functionality regarding dual channel systems and/or systems which reduce cross-talk among "hops" of an overall communication channel.

Illustrative communication subsystem 600 may also comprises a pulse modulation system 608. The pulse modulation system 608 couples to the control electronics 602 such that the control electronics may encode data in pressure pulses within the drilling fluid of the drill string (e.g., at the surface). In some cases the pulse modulation system 608 may create positive pressure pulses by selectively restricting flow of drilling fluid (e.g., selecting closing or partially closing an internal poppet valve, or otherwise restricting cross-sectional area of a flow pathway of the drilling fluid). In yet still other cases the pulse modulation system may create negative pressure pulses (e.g., by selectively dumping drilling fluid to the annulus by way of valve). Regardless of the type of pulses created, in embodiments that utilize a pulse modulation system 608 the control electronics may encode data in the pressure pulses using any suitable modulation scheme, such as pulse-position modulation. While in some embodiments both a gamma source 606 and a pulse modulation system 608 may be implemented, in other cases the gamma source 606 may be omitted in favor of the pulse modulation system 608, or the pulse modulation system 608 may be omitted in favor of the gamma source 606.

Finally, the illustrative communication subsystem 600 may comprise battery system 610. The battery system 610 may comprise one or more rechargeable batteries, and thus may provide operational power to any or all of the electrical components of the communication subsystem 600. So as not to unduly complicate the figure, the electrical connections from the battery system 610 to the other components have been omitted. In some embodiments, the battery system 610 is charged at the surface and provides operational power to the other components based solely on the charge provided at the surface. In yet still other cases, communication system 600 derives operational power from other downhole sources (e.g., by extracting energy from the drilling fluid moving with the drill string) such that the battery system 610 need only provide power during periods of time when the pumping of drilling fluid through the drill string has ceased. In yet still further embodiments, the battery system 610 may be charged downhole by power from other downhole sources (e.g., energy extracted from drilling fluid).

Figure 7:
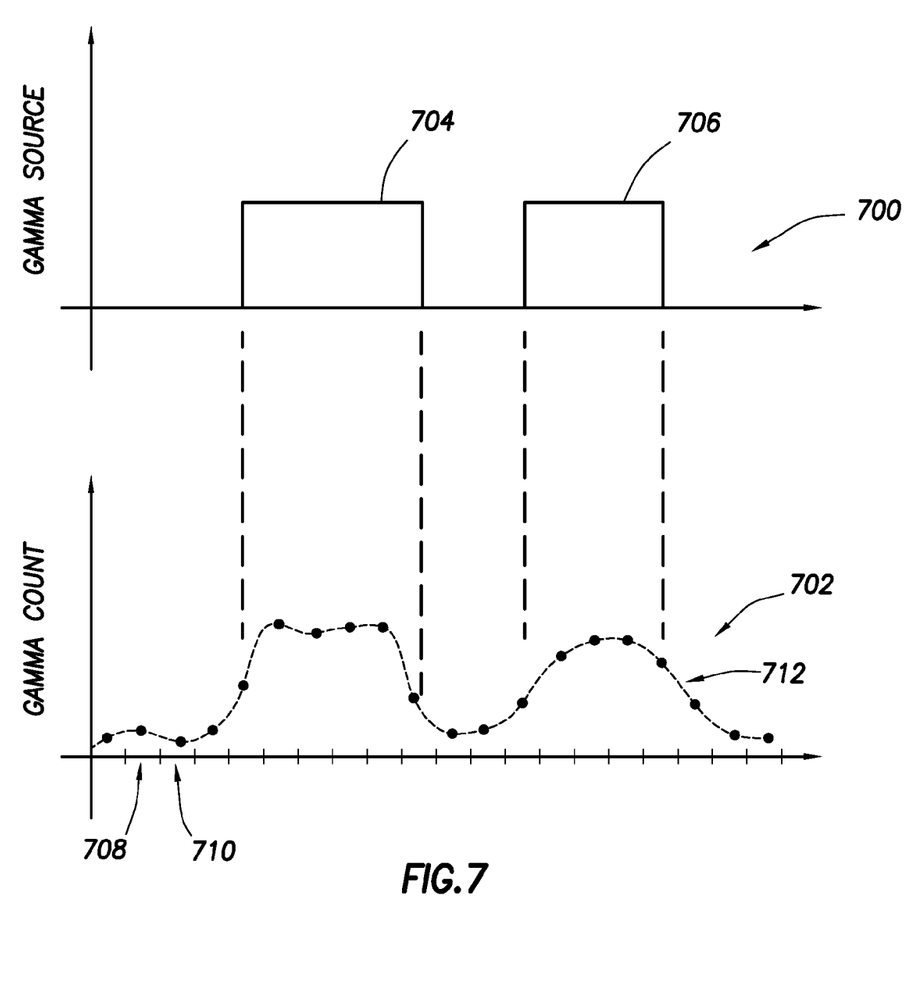
FIG. 7 shows plots relating gamma source activation and gamma count rates in accordance with at least some embodiments.

The specification now turns to illustrative embodiments of detecting gamma bursts and decoding data encoded within the gamma bursts. FIG. 7 shows a plurality of graphs as a function of corresponding time in order to describe how the gamma arrivals are recorded and characterized in accordance with at least some embodiments. In particular, FIG. 7 shows an upper graph 700 relating to activation of a gamma source, and a lower graph 702 showing count rates as a function of time. Turning first to the upper graph 700, upper graph 700 is Boolean in the sense that the graph shows when the gamma source is generating and/or releasing gammas (i.e., bursts periods), and when the gamma source is not. With respect to the upper graph 700, the gamma source is generating and/or releasing gammas during the asserted states 704 and 706, and the gamma source is off during the remaining time. As will be discussed more below, encoding data in gamma bursts in accordance with at least some embodiments involves encoding data as the time spans between gamma bursts.

The lower graph 702 shows gamma count rates for a gamma detector. In particular, in accordance with at least some embodiments each gamma arrival at a gamma detector is tracked based on arrival time, and in some cases energy of the gamma. With respect to counting gamma arrivals by a gamma detector, arrival time is divided into a plurality of time slots or time bins, such as bins 708 and 710. In some embodiments each bin is of equal time duration, but in other cases bins of varying time width may be used (e.g., as a function of count rate within the bin). Each gamma that arrives within a particular time bin increases the count value of gammas within that time bin. While in some embodiments the actual arrival time of the gammas within the time bin may be discarded, in other embodiments the actual arrival may be retained and used. Thus, gamma arrivals increase the count value for the particular time bin. Once the time period for the time bin expires, the system starts counting anew the arrivals of gammas within the next time bin, and so on.

Illustrative count values for each time bin are shown in the lower graph 702 of FIG. 7 as dots in the center of each time bin. The count value for each time bin is represented by the height of the dot above the x-axis (i.e., the y-axis value). Taking all the count values over a particular time for a particular detector together, the dots may be connected by an imaginary line (shown in dashed form in FIG. 7) to form a mathematical curve 712 illustrative of the number of gamma arrivals as a function of time detected by the particular gamma detector. From the curve 712 the arrival and relative position of each gamma pulse may determined. In some embodiments, it is the time between successive gamma pulses within which data is encoded.

Before proceeding, it is noted that the gamma count values as a function of time for lower graph 702 are independent of energy of the gammas. That is, regardless of energy each gamma arrival is counted and adds to the count value within the time bin. In other embodiments, however, the gamma count value used may be based on filtering of gammas of different energy. For example, in embodiments where gammas of different average energy are used for each "hop" in an attempt to reduce system noise, gammas of average energy not used for the particular "hop" can be algorithmically excluded. As yet another example, in "dual channel" systems where a first portion of the data is encoded in gammas of a first average energy and a second portion is encoded in gammas of a second average energy, the energy of each arriving gamma may be used to algorithmically separate arrivals by energy and thereby create a curve similar to the lower graph 702 of FIG. 7 for each average energy used.

Figure 8:
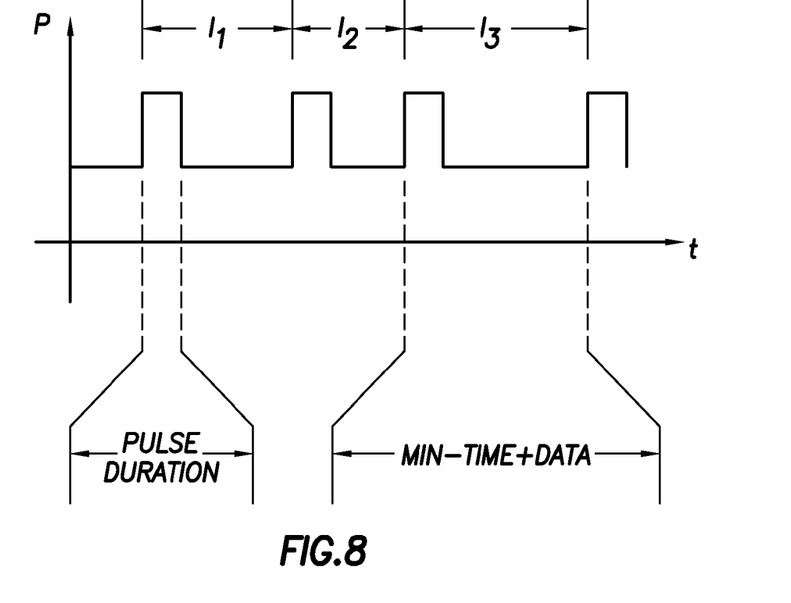
FIG. 8 shows a plot of gamma pulses encoding data to help explain communication parameters in accordance with at least some embodiments.
Figure 9:
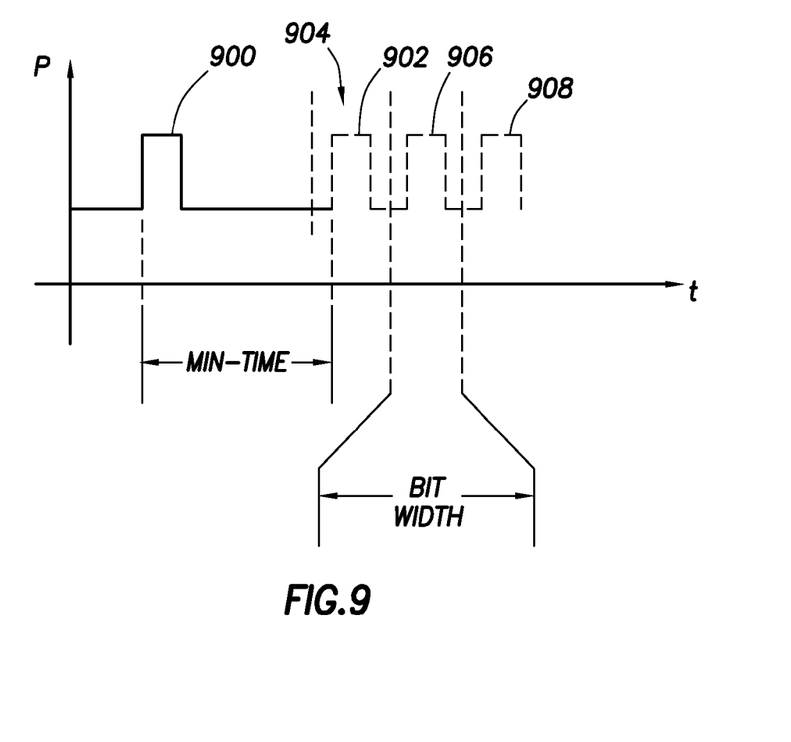
FIG. 9 shows a plot of gamma pulses encoding data to help explain communication parameters in accordance with at least some embodiments.

In order to explain an illustrative encoding system useful in the various embodiments, attention now turns to FIGS. 8 and 9. FIG. 8 shows an exemplary graph of gamma count rates as a function of time, which gamma count rate may be measured by a gamma detector of a communication subsystem. So as not to unduly complicate the figure, the illustrative graph of FIG. 8 represents an ideal situation where ideal square wave gamma bursts are created by a gamma source, and the gamma bursts are detected as ideal square waves at the gamma detector. Each burst or pulse has a pulse duration, which pulse duration may be on the order of a few microseconds in some embodiments. In some embodiments, the burst durations are substantially constant to aid in detection. However, in other embodiments a variety of pulse durations may be selectively used.

In accordance with a specific embodiment, data is transmitted in intervals, and FIG. 8 shows three such intervals $I_1$, $I_2$ and $I_3$. An interval is the amount of time between coherent features of two consecutive gamma bursts. For example, and as shown, an interval may be an amount of time between leading transitions of each gamma burst. Alternatively, an interval may be the amount of time between trailing transitions of each gamma burst, or the amount of time between the centers of each gamma burst. Each interval has a duration that is at least a minimum time (MIN-TIME). An interval having duration substantially equal to the MIN-TIME encodes a data value zero. The MIN-TIME duration may allow gamma density to settle after a gamma burst. The MIN-TIME may change for each particular drilling situation, but in most cases MIN-TIME may be set in the millisecond range.

FIG. 9 shows a single interval comprising a first gamma burst 900 and several possible second gamma bursts (shown in dashed lines) to further illustrate parameters. In particular, the pulse position modulation aspect of particular embodiments utilizes a window in which a gamma burst of an interval may fall, yet still represent the same value. After the MIN-TIME, a gamma burst may fall within one of several BIT-WIDTH windows. So long as pulse falls somewhere within the BIT-WIDTH window, the data value encoded is still the same. For example, the gamma burst 902 falls within a first BIT-WIDTH window 904, and thus in this particular example the interval encodes a data value zero (e.g., hexadecimal 00). Gamma burst 906 falls within the next BIT-WIDTH window, and therefore the time duration between gamma burst 900 and gamma bust 906 represents a first data value (e.g., hexadecimal 01). Likewise, the gamma bust 908 falls within the third BIT-WIDTH window, and therefore the time duration between gamma burst 400 and gamma burst 408 may represent a second data value (e.g., hexadecimal 10). The data value may be decoded using substantially the following equation:

$$\text{DATA} = (\text{INTERVAL} - \text{MIN-TIME})/\text{BIT-WIDTH} \quad (1)$$

Where DATA is the decoded value, INTERVAL is the measured time between coherent features of the two gamma bursts, and MIN-TIME and BIT-WIDTH are as described above. The BIT-WIDTH may change for each particular drilling situation. For a particular number of bits encoded within each interval, there is a maximum time (MAX-TIME) duration. For example, if a particular interval encodes a four-bit number (which could therefore range from zero to fifteen), the four-bit number at its maximum value forces an interval duration equal to MAX-TIME.

The various parameters may be selected according to the specifics of each situation. For short range communications (e.g., across a mud motor or agitator) the gamma burst strength and/or gamma density at the gamma detector may enable short MIN-TIME, narrow BIT-WIDTH, and long MAX-TIME parameters, which tend to increase the data rate. For longer range communication (e.g., spanning several sections of drill pipe), gamma burst strength and/or gamma density at the gamma detector may dictate longer MIN-TIME, wider BIT-WIDTH, and shorter MAX-TIME parameters, which tend to decrease the data rate. However, gammas travel at or slightly below the speed of light, and thus even comparatively "slow" long range communication will still be at much greater speeds than mud pulse telemetry systems.

Figure 10:
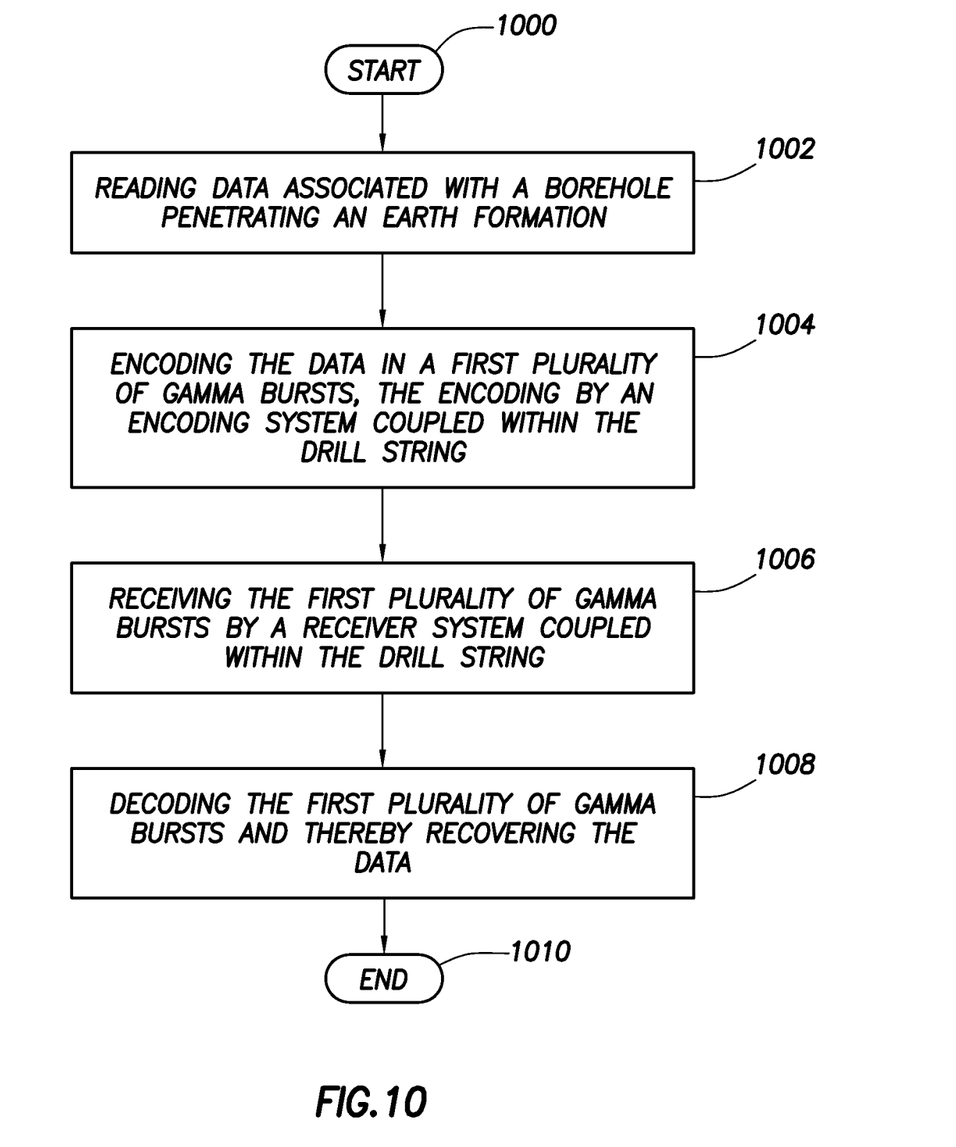
FIG. 10 shows a method in accordance with at least some embodiments.

FIG. 10 show a method in accordance with at least some embodiments. Portions of the illustrative method may be performed in software executed on a computer system. The method starts (block 1000) and comprises: reading data associated with a borehole penetrating an earth formation (block 1002); encoding the data in a first plurality of gamma bursts, the encoding by an encoding system coupled within the drill string (block 1004); receiving the first plurality of gamma bursts by a receiver system coupled within the drill string (block 1006); and decoding the first plurality of gamma bursts and thereby recovering the data (block 1008). Thereafter, the method ends (block 1010).

From the description provided herein, those skilled in the art are readily able to combine software created as described with appropriate general-purpose or special-purpose computer hardware to create a computer system and/or computer sub-components in accordance with the various embodiments, to create a computer system and/or computer sub-components for carrying out the methods of the various embodiments and/or to create a non-transitory computer-readable medium (i.e., not a carrier wave) that stores a software program to implement the method aspects of the various embodiments.

The above discussion is meant to be illustrative of the principles and various embodiments of the present invention. Numerous variations and modifications will become apparent to those skilled in the art once the above disclosure is fully appreciated. For example, the duties of processor 624 within the gamma detector 604 may be performed directly by the control electronics 602, and thus in some embodiments the processor 624 may be omitted. It is intended that the following claims be interpreted to embrace all such variations and modifications.

What is claimed:

1. A method comprising:
   reading data associated with a borehole penetrating an earth formation;
   encoding the data in a first plurality of gamma bursts, the encoding by an encoding system coupled within the drill string, and where the each gamma burst travels a first distance along the borehole;
   receiving the first plurality of gamma bursts by a receiver system coupled within the drill string; and
   decoding the first plurality of gamma bursts and thereby recovering the data.

2. The method of claim 1 further comprising, after the decoding, encoding the data in a carrier medium, the carrier medium carries the data a second distance along the borehole, the second distance at least partially non-overlapping the first distance.

3. The method of claim 2 wherein encoding the data in a carrier medium further comprises encoding the data in at least one selected from the group consisting of: a second plurality of gamma bursts; a plurality of pressure pulses within a drilling fluid column associated with the drill string; and an electromagnetic wave.

4. The method of claim 1:
wherein encoding further comprises:
encoding a first portion of the data in the plurality of gamma bursts; and substantially simultaneously
encoding a second portion of the data in a second plurality of gamma bursts, the second plurality of gamma bursts having different average energies than gammas of the first plurality of gamma bursts;
wherein receiving further comprises:
receiving the first and second plurality of gamma bursts at a detector; and
algorithmically separating the first plurality of gamma bursts from the second plurality of gamma bursts.

5. The method of claim 1 further comprising absorbing gammas traveling in directions other than directions where gammas will enter drilling fluid within the drill string, the absorbing by shielding material.

6. The method of claim 1 further comprising directing the first distances spans at least one selected from the group consisting of: a downhole mud motor associated with the drill string; an agitator associated drill string; and a predetermined number of drill pipes at least partially defining the drill string.

7. A system comprising:
a first communication subsystem comprising:
a first tool body that defines an inner fluid pathway, and the first tool body defines a connector that couples the first communication subsystem within a drill string;
a first control electronics associated with the first tool body, the first control electronics receives data from one or more logging tools coupled within the drill string; and
a first gamma source associated with the first tool body, the first gamma source operatively coupled to the first control electronics, and the first gamma source causes gamma bursts under command of the first control electronics;
wherein the first control electronics encodes data from the logging tool in gamma bursts created by the first gamma source;
a second communication subsystem comprising:
a second tool body that defines an inner fluid pathway, the second tool body distinct from the first tool body, and the second tool body defines a connector that couples the second communication subsystem within the drill string;
a gamma detector associated with the second tool body; and
a second control electronics associated with the second tool body and operatively coupled to the gamma detector;
wherein the second control electronics decodes the data encoded in gamma bursts created by the first gamma source.

8. The system of claim 7 wherein the second communication subsystem further comprises:
a second gamma source associated with the second tool body, the second gamma source operatively coupled to the second control electronics, and the second gamma source causes gamma bursts under control of the second control electronics;
wherein after the second control electronics decodes at least a portion of the data encoded in gamma bursts created by the first gamma source, the second control electronics encodes the data in gamma bursts created by the second gamma source.

9. The system of claim 7 wherein the second communication subsystem further comprises:
a pulse system that creates pressure pulses within the inner fluid pathway of the second tool body, the pulse system in operational relationship to the inner fluid pathway of the second tool body, and the pulse system operatively coupled to the second control electronics;
wherein after the second control electronics decodes at least a portion of the data encoded in gamma bursts created by the first gamma source, the second control electronics encodes the data in pressure pulses within the inner fluid pathway of the second tool body.

10. The system of claim 7:
wherein the first communication subsystem further comprises:
a second gamma source associated with the first tool body and operatively coupled to the first control electronics, the second gamma source distinct from the first gamma source, the second gamma source causes gamma bursts made up of gammas with different average energy than gamma bursts of the first gamma source;
the first control electronics encodes a first portion of the data in gamma bursts created by the first gamma source; and substantially simultaneously
the first control electronics encodes a second portion of the data in gamma bursts created by the second gamma source;
wherein first gamma detector detects gamma bursts created by the first and second gamma sources, and the second control electronics decodes the first portion of the data and the second portion of the data.

11. The system of claim 7 wherein the first communication subsystem further comprises shield material in operational relationship to the first gamma source, the shield material reduces density of gammas traveling in directions other than in the direction of the inner fluid channel of second communication subsystem.

12. The system of claim 7 wherein the first control system coordinates encoding the data from the logging tool with activation of a nuclear tool within the drill string.

13. A drilling system comprising:
a drill bit disposed on a distal end of the drill string, the drill string and drill bit disposed within a borehole;
a logging tool coupled to the drill bit, the logging tool creates data associated with a drilling operation;
a first communication subsystem coupled to the logging tool; an intermediate downhole device coupled within the drill string above the drill bit, logging tool and first communication subsystem;
a second communication subsystem coupled within the drill string above the intermediate downhole device;
wherein the first communication subsystem modulates data from the logging tool in gamma bursts that travel through drilling fluid past the intermediate downhole device; and
wherein the second communication subsystem wherein decodes the data encoded in gamma bursts created by the first communication subsystem.

14. The drilling system of claim 13 wherein the intermediate downhole device is at least one selected from the group consisting of: a mud motor that turns the drill bit from power derived from drilling fluid within the drill string; and an agitator that vibrates the drill string based on power derived from drilling fluid within the drill string.

15. The drilling system of claim 13:
   wherein the first communication subsystem further comprises:
      a first tool body that defines an inner fluid pathway, and the first tool coupled to the logging tool;
      a first control electronics associated with the first tool body, the first control electronics receives data from the logging tool; and
      a first gamma source associated with the first tool body, the first gamma source operatively coupled to the first control electronics, and the first gamma source causes gamma bursts under command of the first control electronics;
      wherein when the first communication subsystem modulates data, the first control electronics modulates the data in gamma bursts created by the first gamma source;
   wherein the second communication subsystem further comprises:
      a second tool body that defines an inner fluid pathway, the second tool body coupled within the drill string above the intermediate downhole device;
      a gamma detector associated with the second tool body; and
      a second control electronics associated with the second tool body and operatively coupled to the gamma detector;
      wherein when the second communication subsystem decodes the data, the second control electronics decodes gamma bursts received by the gamma detector.

16. The system of claim 15 wherein the second communication subsystem further comprises:
   a second gamma source associated with the second tool body, the second gamma source operatively coupled to the second control electronics, and the second gamma source causes gamma bursts under control of the second control electronics;
   wherein after the second control electronics decodes at least a portion of the data encoded in gamma bursts created by the first gamma source, the second control electronics encodes the data in gamma bursts created by the second gamma source.

17. The system of claim 15 wherein the second communication subsystem further comprises:
   a pressure pulse system in operational relationship to the inner fluid pathway of the second tool body, and the pressure pulse system operatively coupled to the second control electronics;
   wherein after the second control electronics decodes at least a portion of the data encoded in gamma bursts created by the first gamma source, the second control electronics encodes the data in pressure pulses within the inner fluid pathway of the second tool body.

18. The system of claim 15:
   wherein the first communication subsystem further comprises:
      a second gamma source associated with the first tool body and operatively coupled to the first control electronics, the second gamma source distinct from the first gamma source, the second gamma source causes gamma bursts made up of gammas with different average energy than gamma bursts of the first gamma source;
      the first control electronics encodes a first portion of the data from the logging tool in gamma bursts created by the first gamma source; and substantially simultaneously
      the first control electronics encodes a second portion of the data from the logging tool in gamma bursts created by the second gamma source;
   wherein first gamma detector detects gamma bursts created by the first and second gamma sources, and the second control electronics decodes the first portion of the data and the second portion of the data.

19. The drilling system of claim 13 wherein gamma bursts caused by the first communication subsystem travel predominantly within the drill string.

20. The drilling system of claim 13 wherein the second communication subsystem modulates the data in a carrier medium being at least one selected from the group consisting of: further gamma bursts; drilling fluid pressure pulses; and electromagnetic waves.

* * * * *